Patented Nov. 24, 1953

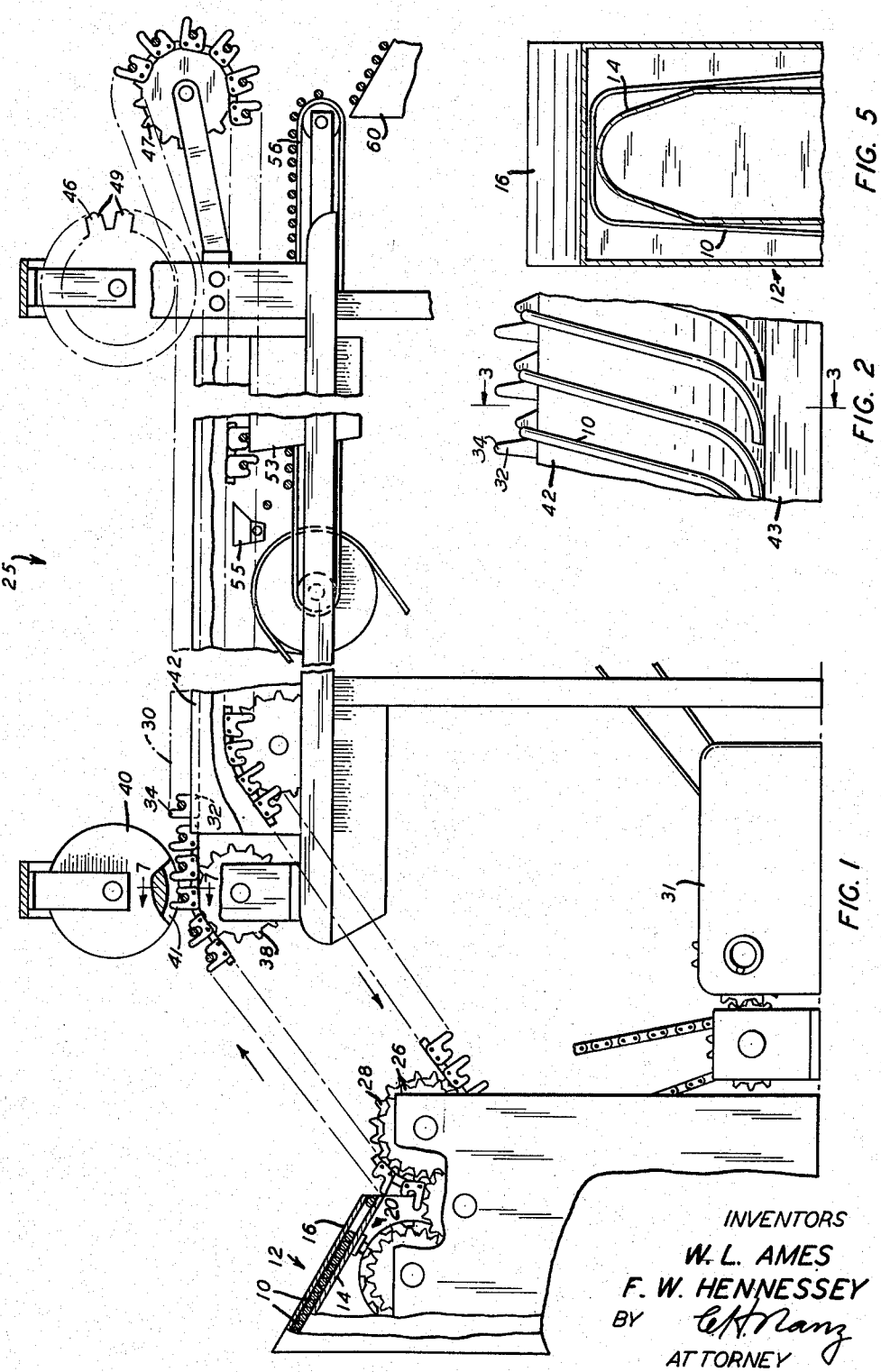

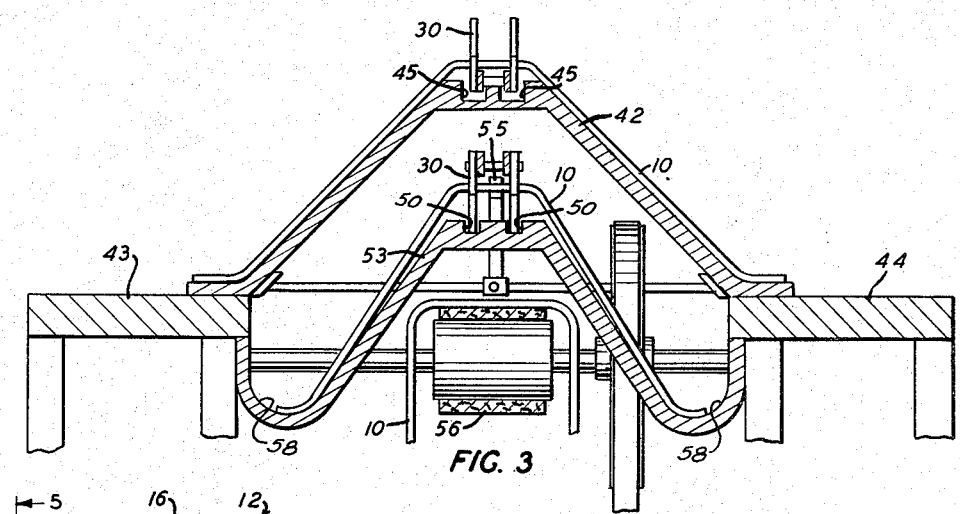
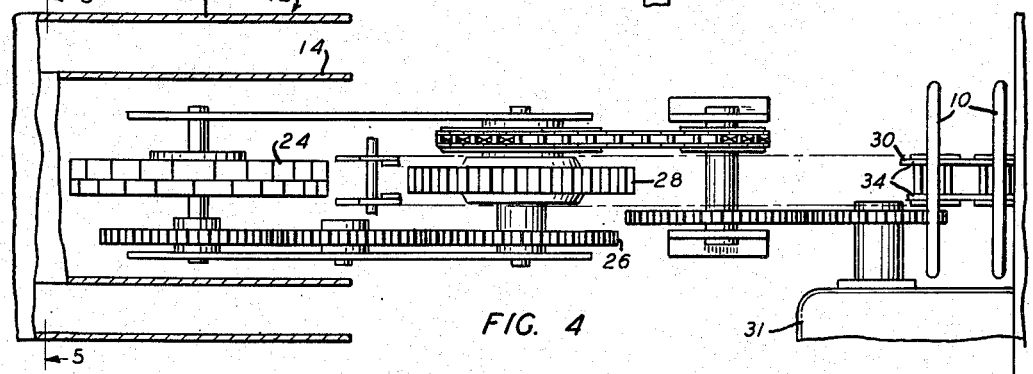
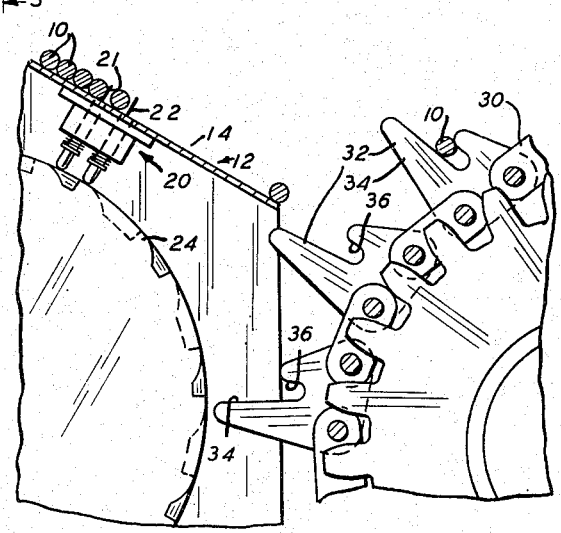
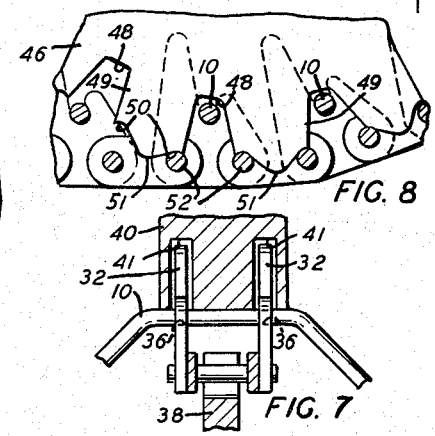

2,660,287

UNITED STATES PATENT OFFICE 2,660,287

ARTICLE-HANDLING APPARATUS

William L. Ames, Middle River, and Francis W. Hennessey, Baltimore, Md., assignors to Western Electric Company, Incorporated, New York, N. Y., a corporation of New York Application November 13, 1950, Serial No. 195,402

4 Claims. (Cl. 198—26)

This invention relates to article-handling apparatus, and more particularly to apparatus for conveying articles along a plurality of work stations.

In the manufacture of tipped and banded cords, such as cords used in telephone or other types of communications system, considerable manual operations are required in tipping and banding the cords and in performing other operations on the ends of the cords. In the past there has been no satisfactory apparatus for providing assembly line work on such cords.

An object of the invention is to provide new and improved article-handling apparatus.

A further object of the invention is to provide new and improved apparatus for handling cords and conveying them along a plurality of work stations.

Another object of the invention is to provide apparatus for conveying cords along a series of work stations, for storing the cords and for conveying the cords along another series of work stations.

An apparatus illustrating certain features of the invention may include a guide of generally inverted V-shape in cross-section and means for conveying elongated articles along the guide transversely with respect to the guide.

A complete understanding of the invention may be obtained from the following detailed description of an apparatus forming a specific embodiment thereof, when read in conjunction with the appended drawings, in which:

Fig. 1 is a front elevation of an apparatus forming one embodiment of the invention with portions thereof broken away;

Fig. 2 is an enlarged, fragmentary front elevation of a portion of the apparatus shown in Fig. 1;

Fig. 3 is an enlarged, vertical section taken along line 3—3 of Fig. 2;

Fig. 4 is an enlarged, top plan view of the apparatus with portions thereof broken away;

Fig. 5 is an enlarged vertical section taken along line 5—5 of Fig. 4;

Fig. 6 is an enlarged, fragmentary, vertical section of a portion of the apparatus;

Fig. 7 is an enlarged, vertical section taken along line 7—7 of Fig. 1, and

Fig. 8 is an enlarged, fragmentary, vertical section of a portion of the apparatus shown in Fig. 1.

Referring now to Fig. 1 of the drawings, a series of cords 10—10 are cut from a long length of continuous cordage by means of a cordage slitting and cutting machine (not shown), and the cut cords 10—10 fall transversely onto a feed chute 12 along which the cords slide by gravity. The chute 12 includes an inverted channel 14 and a guide 16 (Fig. 5) spaced therefrom slightly over the thickness of the cords. The guide 16 keeps the cords on the channel in a single layer. An escapement 20 includes normally depressed pins 21 and 22 (Fig. 6), which are spaced apart a distance slightly greater than the diameter of one of the cords 10—10, and are periodically and alternately projected into the path of the cords 10—10 by a dual cam 24 to permit the cords to slide off the chute 12 one at a time to a work unit 25. The cam 24 is driven by gearing 26 (Fig. 4), which is driven in synchronism with a sprocket 28 driving a cord-conveying chain 30. The sprocket 28 is driven by a drive including a manually adjustable transmission 31.

The chain 30 includes a series of cord carriers 32—32, each of which is provided with a cord catching finger 34 and a gripping notch 36 that is slightly narrower than the diameter of the cords 10—10. The timing of the escapement 20 is such that each of the cords drops onto a pair of the fingers 34—34 and slides down the fingers toward the notches 36—36 as the chain 30 advances the pair of fingers past the chute 12. The chain 30 travels from the sprocket 28 to a guide sprocket 38, which is driven in synchronism and in an inrunning direction with respect to a pressing roll 40 (Figs. 1 and 7) having peripheral grooves 41—41 that provide clearance for the carriers 32—32. The periphery of the roll 40 engages the cords 10—10 and presses them into the notches 36—36.

As the chain 30 leaves the sprocket 38, the chain and the cords carried thereby are advanced over a guide 42 (Figs. 1, 2 and 3) that is mounted on work benches 43 and 44. The guide 42 (Fig. 3) is roughly of the shape of an inverted V in cross-section, and the ends of the cords 10—10 hang down on opposite sides of the guide 42 as they are advanced therealong with the end portions of the cords dragging along the benches 43 and 44. The guide 42 has grooves 45—45 therein to provide clearance for the chain and to guide the chain along the top of the guide. Operators sitting along the work benches 43 and 44 apply terminals to the ends of the cords 10—10, and perform other operations on the ends of the cords, as the cords are advanced therepast. The guide 42 deflects the ends of the cords to positions on the work benches convenient for operations thereon.

The chain 30 advances the cords 10—10 from the guide 42 under a hold-down disc 46 (Figs. 1 and 3) mounted between the links of the chain 30, upwardly to and around a sprocket 47. The disc 46 is driven in synchronism with the chain 30, and is provided with notches 48—48 providing clearance for the cords 10—10. This disc is also provided with teeth 49—49 having notches 50—50 and lobes 51—51. The teeth engage cross pins 52—52 of the chain, and hold the chain down as it travels around the disc to the sprocket 47.

The chain 30 travels around the sprocket 47, and then carries the cords 10—10 in inverted positions over a lower guide 53 having grooves 54—54 (Fig. 3) for receiving the carriers 32—32. The cords are held by friction in the notches 36—36 even though the notches are inverted. A wedge-shaped separator 55 engages the cords and forces them out of the notches 36—36 to cause the cords to drop cross-wise onto a belt conveyer 56. As the cords 10—10 are advanced by the conveyer 56, the ends of the cords 10—10 are supported by troughs 58—58 forming a part of the lower guide 53. The conveyer 56 tends to advance the cords 10—10 continuously from left to right, as viewed in Fig. 1, toward a chute 60. The cords 10—10 slide down the chute 60 to an escapement (not shown) which is identical in construction and principal of operation with the escapement mechanism 20. The second escapement is actuated through a drive of another work unit (not shown) identical with the work unit 25, and feeds the cords to the second work unit. The second work unit and the escapement associated with the chute 60 are driven independently of the drive for the work unit 25 so that the work on the cords at the second work unit may be at a different speed than that of the work unit 25.

Operation

The cords 10—10 are dropped transversely into the chute 12, and the escapement mechanism 20 causes the cords 10—10 to drop one at a time onto the fingers 34—34 of the pairs of carriers 32—32. The cords 10—10 are conveyed upwardly by the carriers 32—32 and pass under the pressing roll 40, the periphery of which presses the cords tightly into the notches 36—36. The cords are carried transversely along the guide 42, and are processed while carried thereon by the operators at the work benches 43 and 44.

The cords 10—10 then are passed over the return sprocket 47, and are held by the lower guide 53 out of contact with the belt conveyer 56. The carriers 32—32 then are in inverted positions and carry the cords against the separator 55, which forces them out of the notches 36—36 in the holders 32—32 and drops them onto the belt conveyer 56. The cords are carried by the conveyer 56 to the chute 60, and slide down the chute 60 to the second escapement (not shown), which feeds the cords to the second work unit (not shown) at the rate at which that work unit is operated, which may be slower than the rate of operation of the work unit 25. When the operation of the second work unit is slower than that of the work unit 25, the cords bunch-up on the belt conveyer 56, which merely slides thereunder and keeps them in a single layer therealong until they are needed by the second work unit.

The work-handling system described hereinabove provides a high degree of flexibility in the operations performed at both the work unit 25 and the second work unit, and conveys the cords along the work units at the rate at which the operators can process the cords along the individual work units, depending of course upon the number of operators at each of the work units. Thus, if an odd number of operators are provided for both units, the work unit 25 may be run more rapidly than the second work unit until a substantial supply of cords is stored on the conveyer belt 56. Then an operator may be shifted from the work unit 25 to the second work unit, after which the operation of the work unit 25 is slowed down and the second work unit is speeded up until the surplus cordage on the conveyer 56 has been used up. Furthermore, each of the work units positions the cords very conveniently to the operators, and the cords carried thereby need very little manipulating to place them in proper position for work on the tips thereof.

What is claimed is:

1. An article-handling apparatus, which comprises a guide of inverted V-shape in cross-section, means for advancing cordage extending across said guide along the guide, a second guide of similar cross-section positioned below the first-mentioned guide and extending along a portion of the length of the first guide, a belt conveyer positioned below the guides, an endless conveyer travelling above the first-mentioned guide and between the guides, means for gripping cords carried by the endless conveyer, and means for removing cords from the cord-gripping means and for placing them upon the belt conveyer.

2. An article-handling system, which comprises a guide chute, a pair of spaced fingers positioned at the discharge end of the guide chute and projectable into the path of cords slid transversely down the guide chute, cam means for alternately projecting the two fingers into the path of the cords so that the cords are dropped off the guide chute under escapement action, a first conveyer element having fingers projecting transversely therefrom, means for advancing the conveyer element past the discharge end of the guide chute in synchronization with the action of the cam means so that cords discharged from the guide chute fall upon the fingers projecting from the conveyer element, a guideway having sloping sides, means for guiding the conveyer element along the top of the guideway so that the ends of cords carried by the conveyer element engage the guideway as they are advanced by the conveyer element, means for holding the cords to the conveyer element when the element is advanced along a return portion of its path in which the outer surface of the conveyer element is directed downwardly, a second conveyer element positioned under a portion of the downwardly facing portion of the first conveyer element, and means for removing the cords from the cord holding means so that the cords drop upon the last-mentioned conveyer element.

3. An article-handling system, which comprises a guide chute, a pair of spaced fingers positioned at the discharge end of the guide chute and projectable into the path of cords slid transversely down the guide chute, cam means for alternately projecting the two fingers into the path of the cords so that the cords are dropped off the guide chute under escapement action, a first conveyer element having cord carriers projecting transversely therefrom, said carriers having cord-holding notches and trailing fingers, means for advancing the conveyer element past the discharge end of the guide chute in synchronization with the action thereof so that cords discharged from the guide chute fall upon the carriers, means for pressing the cords into the notches in the carriers, a guideway having sloping sides, means for guiding the conveyer element along the top of the guideway so that the ends of cords carried by the conveyer element engage the guideway as they are advanced by the carriers, a second conveyer element positioned under a portion of the downwardly facing portion of the first conveyer element, and means for removing the cords from the notches in the carriers so that the cords drop upon the last-mentioned conveyer element.

4. An article-handling system, which comprises a guide chute, an escapement positioned at the discharge end of the guide chute, an endless conveyer having notched elements projecting transversely therefrom for receiving cords, means for advancing the conveyer in synchronization with the action of the escapement along an endless path having an upper portion adjacent to the discharge end of the guide chute so that cords discharged from the guide chute fall upon the notched elements, said endless path having a return portion positioned below the upper portion thereof, a guideway extending along the upper portion of the path and having downwardly sloping sides, means for guiding the conveyer along the top of the guideway so that the cords carried by the conveyer engage the sides of the guideway as they are advanced by the conveyer, a second conveyer positioned under a portion of the return portion of the path, and means for wedging the cords from the notched elements so that the cords drop upon the second conveyer.

WILLIAM L. AMES.
FRANCIS W. HENNESSEY.

References Cited in the file of this patent
UNITED STATES PATENTS

| Number | Name | Date |
| --- | --- | --- |
| 1,083,617 | Kast | Jan. 6, 1914 |
| 1,766,645 | Johansson | June 24, 1930 |
| 1,787,383 | Lacy | Dec. 30, 1930 |
| 1,873,456 | Morrow | Aug. 23, 1932 |
| 2,117,501 | Raymond | May 17, 1938 |
| 2,134,832 | Morrison | Nov. 1, 1938 |
| 2,157,289 | Hall | May 9, 1939 |
| 2,292,140 | Lofgren | Aug. 4, 1942 |
| 2,538,144 | Garretto | Jan. 16, 1951 |
| 2,564,056 | Fahey | Aug. 14, 1951 |
| 2,579,129 | Spicer | Dec. 18, 1951 |